United States Patent [19]

Leander et al.

[11] E Re. 29,432

[45] Reissued Oct. 11, 1977

[54] APPARATUS FOR MEASURING AND POSITIONING OF FISH AT HEAD CUTTING

[75] Inventors: Leif Leander; Curt Eriksson, both of Vastra Frolunda, Sweden

[73] Assignee: Arenco-KM AB, Vastra Frolunda, Sweden

[21] Appl. No.: 677,032

[22] Filed: Apr. 14, 1976

Related U.S. Patent Documents

Reissue of:

[64] Patent No.: 3,925,847
Issued: Dec. 16, 1975
Appl. No.: 384,899
Filed: Aug. 2, 1973

[30] Foreign Application Priority Data

Aug. 11, 1972 Sweden ..... 10463/72

[51] Int. Cl.[2] ..... A22C 25/14
[52] U.S. Cl. ..... 17/63
[58] Field of Search ..... 17/63, 61, 59, 60

[56] References Cited

U.S. PATENT DOCUMENTS 2,507,808 5/1950 Oates ..... 17/63
3,461,485 8/1969 Crepeau ..... 17/63

FOREIGN PATENT DOCUMENTS 168,218 8/1959 Sweden ..... 17/61

*Primary Examiner*—Richard C. Pinkham
*Assistant Examiner*—William R. Browne
*Attorney, Agent, or Firm*—Cushman, Darby & Cushman

[57] ABSTRACT

The size of a fish is measured and its position is adjusted in a fish processing machine, in which head cutting is carried out in such a way that the best output possible is obtained without loss of valuable parts. The fish is advanced sidewise in a fish box by a conveyor and before the deheader of the machine is partly introduced into a head box, after which the thickness of the fish is measured by sensing the head of the fish at that portion, which is located behind the eyes and has a substantially constant thickness, and the fish is then displaced in its longitudinal direction to the correct cutting position in dependence of the measured thickness.

7 Claims, 15 Drawing Figures

APPARATUS FOR MEASURING AND POSITIONING OF FISH AT HEAD CUTTING

Matter enclosed in heavy brackets [ ] appears in the original patent but forms no part of this reissue specification; matter printed in italics indicates the additions made by reissue.

This invention relates to an apparatus for carrying out measuring and adjusting the position of the fish in fish processing machines, where head cutting is made in such a way, that the best outcome possible is obtained without loosing valuable portions, wherein the fish by a conveyor is transported sidewise lying on its side in a fish box and the head of the fish is placed in a head box just ahead of the cutting means of the machine, after which the thickness of the fish is measured and the box is displaced in dependence of the measured thickness.

The thickest, relatively soft portion of the fish is measured, passably far behind the head and then the head length is corrected in dependence of the thickness measured by displacing the fish. The fish can, however, be thick or thin in this part depending on the season. On account of this the head cutting can be made on the wrong place so that, for example, pieces of bone from the gillbone are left behind or unnecessarily much meat is cut off. Another way of measuring is to take the measure at the gill arch.

For carrying out such measuring (Swedish patent specification No. 163,031) a measuring wheel has hitherto been used which partly was utilized on the one hand for measuring the thickness of the fish and on the other hand for advancing the fish. The wheel is arranged in the feed direction of the fish above the fish box. The position of the measuring wheel at the measuring operation is transferred via a linkage to the head box into which the fish is advanced with its head, and displaces this a certain distance.

The invention will be more clearly described with reference to the annexed drawings which diagrammatically and as non-limiting examples illustrate some preferred embodiments of the invention.

FIGS. 3a–d illustrate the principle for the head measuring, and the positioning of the fish in the cutting position.

Figure 4:
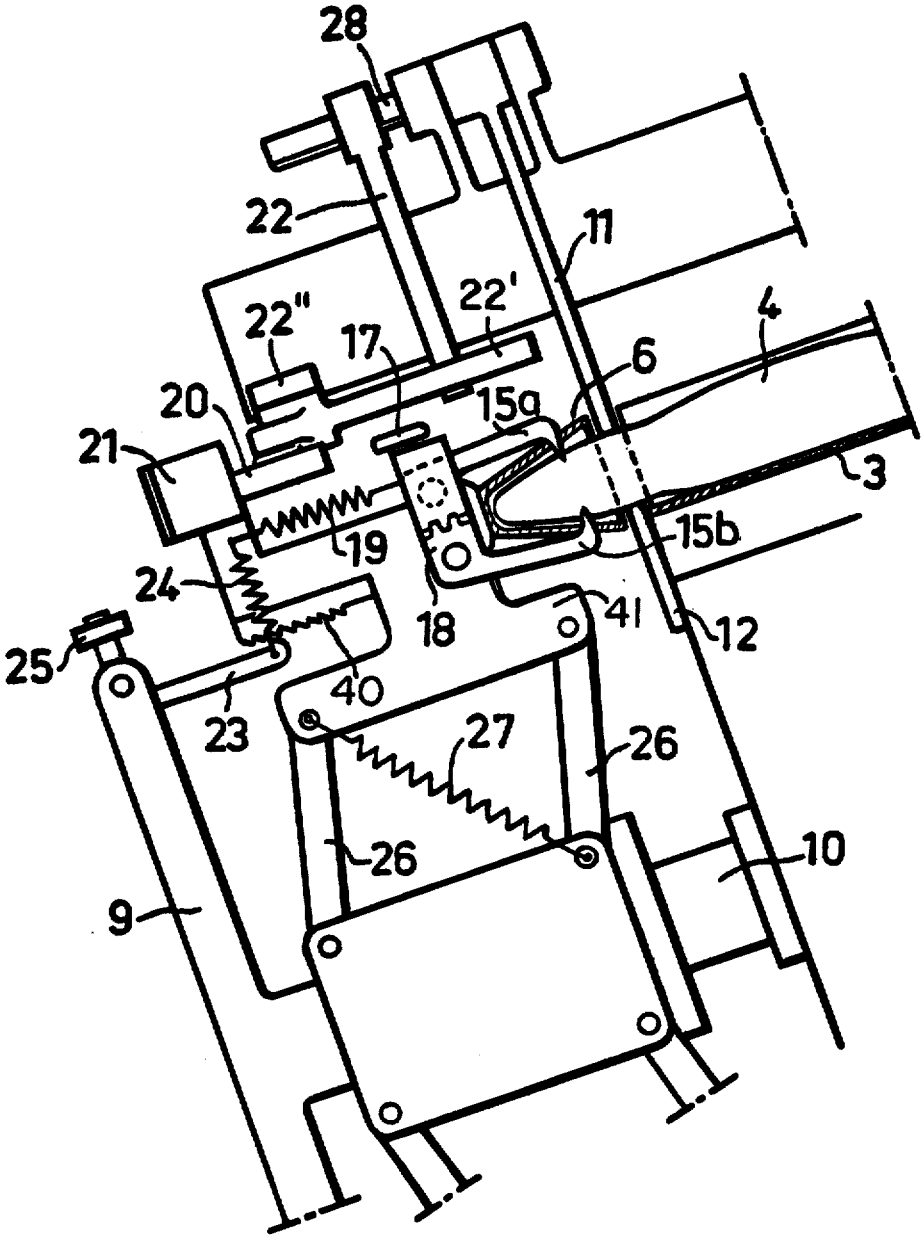
Figure 5:
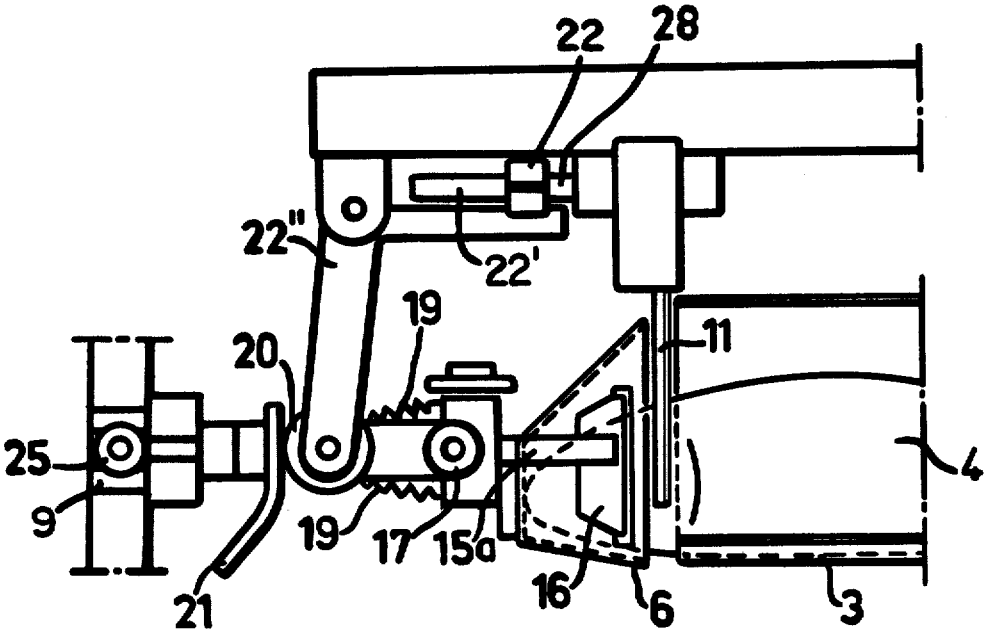

FIGS. 4 and 5 show in detail and in different projections the means for measuring the thickness of the fish head for setting the cutting position of the fish.

Figure 6:
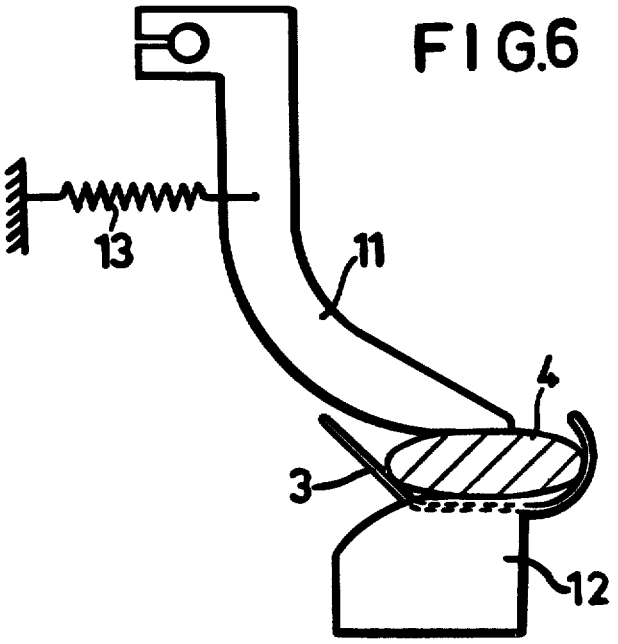

FIG. 6 illustrates the measuring arm for measuring the thickness of the fish head.

Figure 7A:
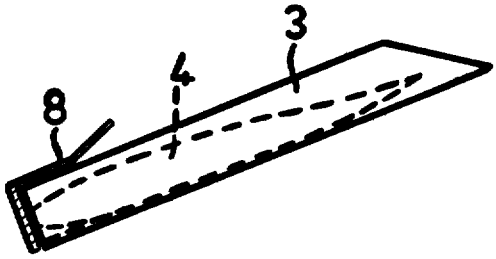
Figure 7B:
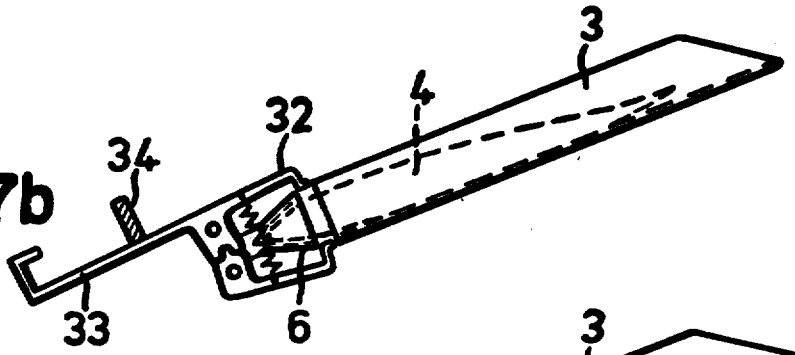
Figure 7C:
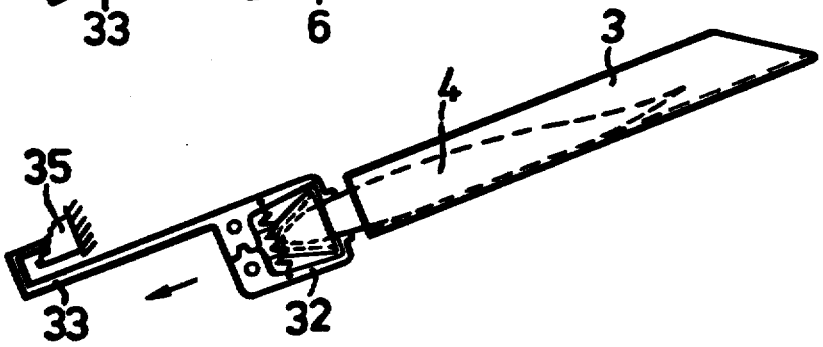

FIGS. 7a–c show the principle for the head measuring and the setting of the fish in the cutting position according to another embodiment.

Figure 8:
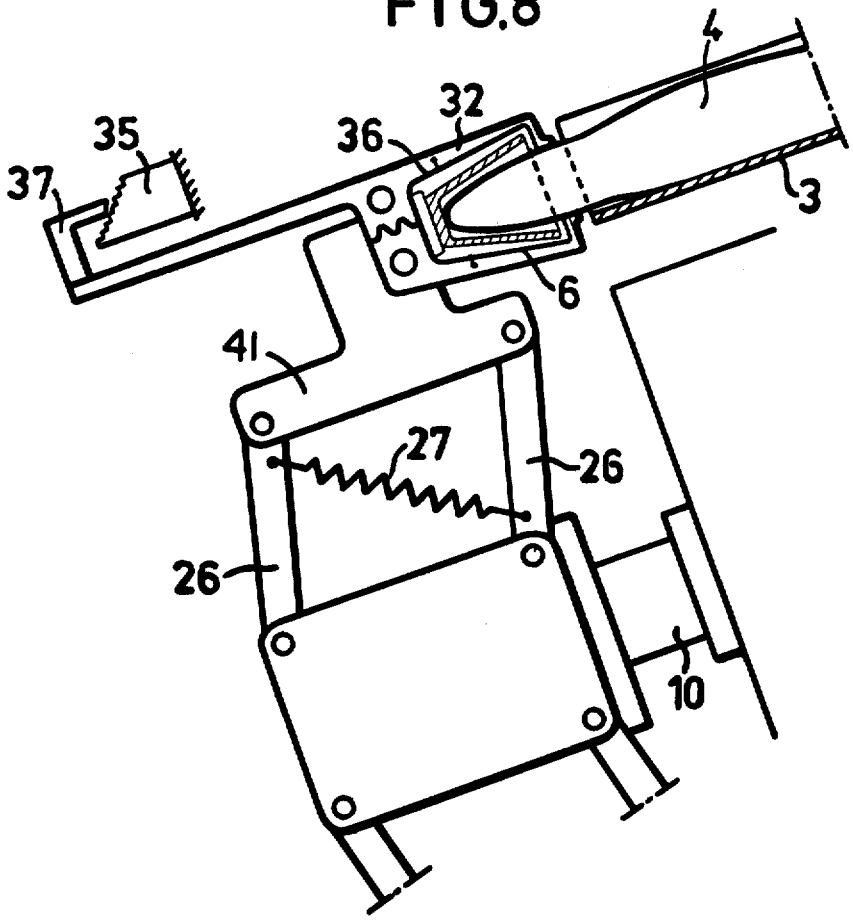
Figure 9:
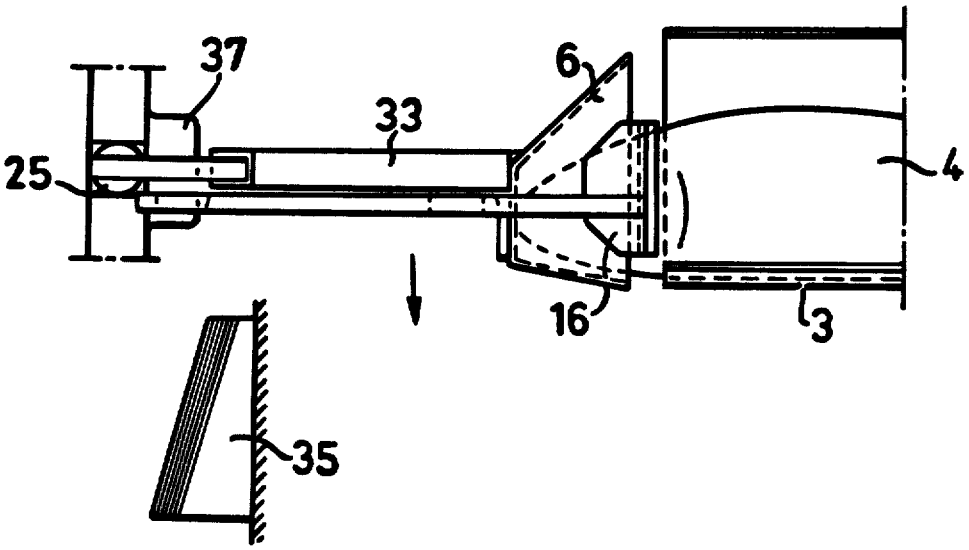

FIGS. 8 and 9 show in detail and in different projections the measuring and setting means of this embodiment.

Figure 1A:
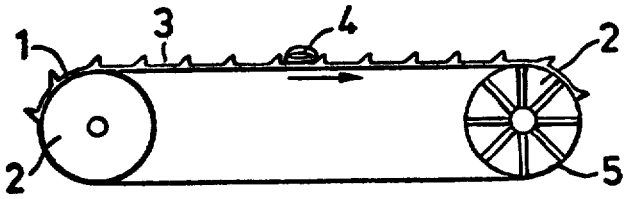
FIGS. 1a and 1b show in a simplified form a fish processing machine for head cutting.
Figure 1B:
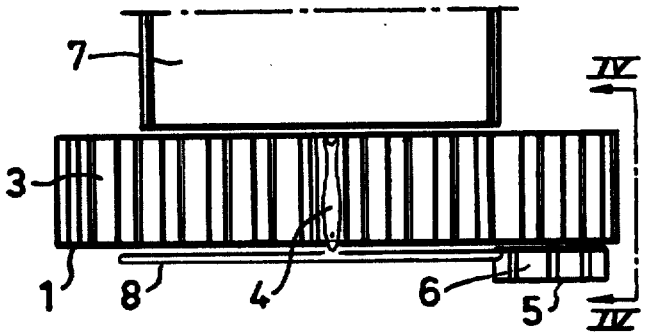
Figure 2:
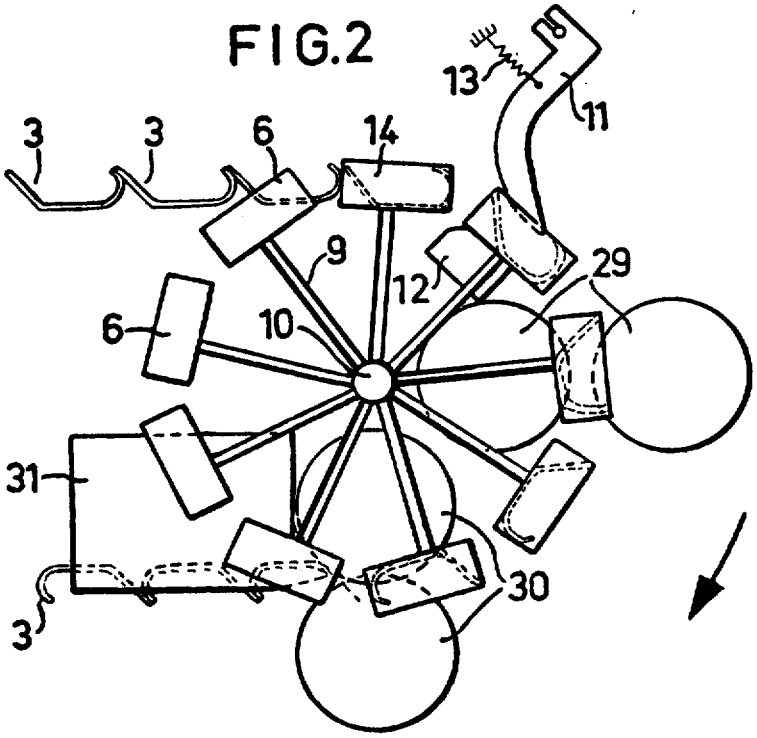
FIG. 2 illustrates diagrammatically the means for head measuring, head cutting and entrail extraction in the machine.
Figure 3A:
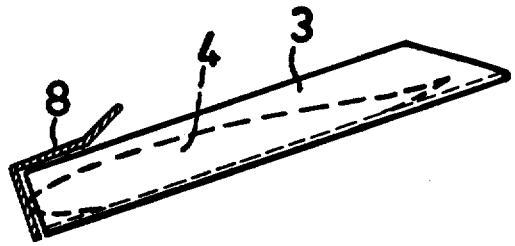
Figure 3B:
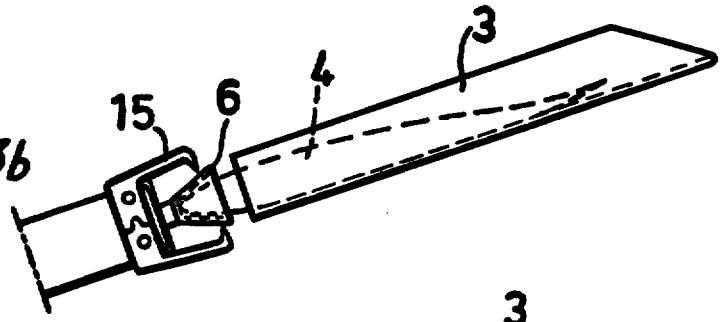
Figure 3C:
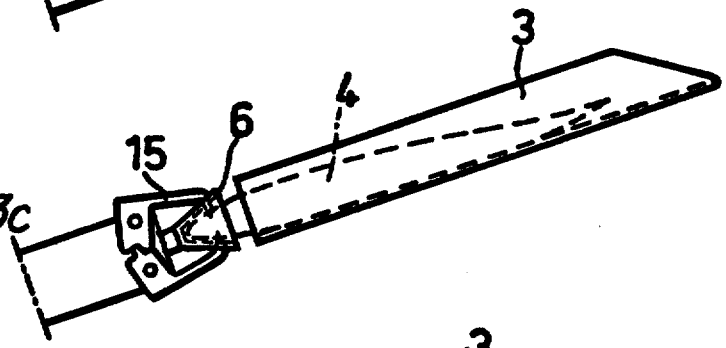
Figure 3D:
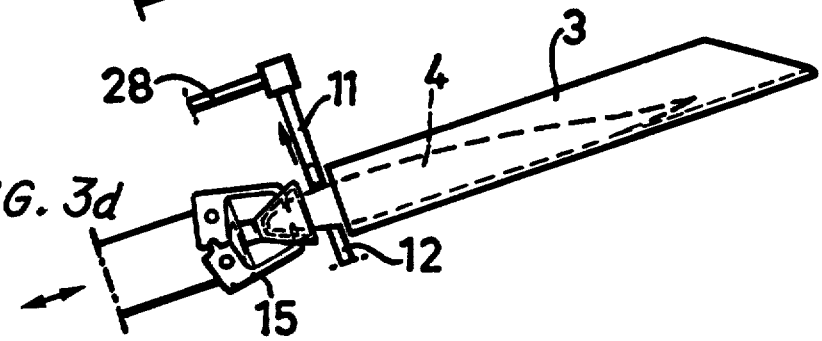

FIGS. 1 and 2 show the principle of a fish processing machine for head cutting. The machine comprises a chain 1 running over wheels 2. The chain 1 contains a number of fish boxes 3, into which the fish 4 is introduced. The fish is fed into the boxes 3 from a feed table

7. The boxes slope downwards from the table 7 in direction towards a stop plate 8, which extends along the chain 1, on that side of the feed table which is turned away from the boxes 3 and has the same extension as the table when measured along the chain 1, and is adapted to prevent the fish from sliding out of the boxes 3. The stop plate 8 extends all the way to a measuring and cutting wheel 5, which is arranged on the same shaft 10 as the wheel 2 and is provided with a number of head boxes 6 at its circumference. These are arranged in such a manner that they at the movement of the wheel will always be located exactly opposite a corresponding fish box 3 and move synchronously with these.

In FIG. 3 the treatment of the fish in this wheel 5 is shown. As mentioned, the fish 4 is in the fish box 3 on the chain 1, which is moving towards the wheel 5. During its advancement the fish is prevented from sliding out of the box by the stop plate 8. When the fish 4, which is lying on its side, has passed the stop plate 8, it is fed perpendicularly to the chain 1 so that the head becomes located in a head box 6. The transfer of the fish to the head box 6 is facilitated because of the slope of the box 3. The feeding into the head box 6 is carried out through water sprinkling, in that the fish is flushed forwards, so to say. The fish 4 slides normally by its own weight, but to further facilitate the feeding down of the fish into the head box a revolving brush may be placed above the fish box 3. The location of the box 6 is made clear by FIG. 3b. In this position the fish 4 has had its head fed into the head box 6. As soon as this has been accomplished, claws 15 seize the fish, as is shown in FIG. 3c. The fish box with the fish 4 passes on between measuring means, which is stationary in the embodiment heredescribed and includes a fixed support 12 and a movable arm 11. The extent of the movement of the arm becomes dependent on the thickness of the fish head. Through a lever system the arm 11 pulls the head box 6 and here described the fish 4 in a direction, which is indicated by the double arrow in FIG. 3d and locks it in an advancement position, which corresponds to the length of the fish head, since this is in a fairly constant relationship to the thickness of the fish head.

In FIG. 2 there is more clearly shown how the wheel 5 is arranged. The wheel comprises a number of spokes 9, which carry one head box 6 each at their respective external ends. In the position designated 14 the fish is introduced into the head box. Then the head cutting is made as described, the fish then passing the support 12 and the arm 11. During this operation the fish is displaced by the claws 16 and the arms 15 as well as the mentioned lever system to the optimum position for head cutting. This is accomplished in two steps. At the passage of the fish between a pair of pre-cutting knives 29 the external portions of the fish are cut through. When the wheel 5 is rotating on, the fish is subsequently advanced between a pair of squeezing knives 30, between which the fish is cut off except for the esophagus. In the means 31 diagrammatically illustrated, the fish head is removed and the esophagus with the stomach contents is extracted in a way known per se. The fish body is then transported by a steering panel for further treatment. The claws 15 are then separated, and the head box 6 returns to right starting point.

FIGS. 4 and 5 illustrate in detail one embodiment of the measuring means. FIG. 4 is a view as seen in the direction of the arrow IV—IV in FIG. 1b and FIG. 5 is an elevation of the fish box 3 and the head box 6 at right angles with respect to that according to FIG. 4. At the lastmentioned boxes claws 16 are arranged on both sides on arms 15a and 15b. The arms can move towards or away from each other through toothed segments 18. The claw arms are held together by springs 19, which are attached to the arm 15a (FIG. 4). The arms 15 are separated when the curve roller 17, which is rotatably journalled on the arm 15a engages a curve which is provided in the machine frame and not shown. Hereby a positive opening of the claws 16 is attained. When the wheel 5 rotates the claws 16 will approach each other and seize the fish 4, when the cam follower 17 slides down from its curve. After that, the fish passes the measuring arms 11 and 12, which are associated with the machine frame. A sectional view of the arms is shown in FIG. 6. The arm 11 is held against the head of the fish by a spring 13. The arm is pivoted in dependence of the thickness of the fish, and the movement of the arm 11 about its pivot causes movement of the lever system 22, 22', 22" operatively connected to member 28 which is operatively connected to arm 11. A curve roller or cam 20 is operatively connected to lever 22" of the lever system 22, 22', 22" for cooperation with a guide curve or cam follower 21 which, as most clearly shown in FIGS. 4 and 5, is operatively connected to a head box 6. As shown in FIG. 4, the cam follower 21 is connected by a plate 41 and a parallel link mechanism 26 to the hub 10 of the wheel 5 so that the head box 6 associated with each cam follower 21 is longitudinally displaceable when the cam follower 21 is acted upon by the roller 20. In the embodiment shown in FIGS. 1–6, the lever system 22, 22', 22" and roller 20 comprise a stationary first control means, while the cam follower 21 latching means 23, 24, 40 and plate 41 comprise a second control means, one second control means associated and movable with each head box 6, and the head box displacing means comprises the plate 41 and the parallel linkage mechanism 26. Accordingly, the curve roller 20 attains a certain position in dependence of the position of the arm 11. When the curve 21 at the turning of the wheel 5 engages the roller 20, also the head box 6 will become displaced to a certain position through the link mechanism 26 and be locked in this position by the catch 23 engaging a selected one of the teeth in the toothed latching rack 40, the catch 23 being held in latched position by the bias of the spring 24. This position is the optimum position for the head cutting. With this arrangement even the arms 11 and 12, which move synchronously and symmetrically forwards and away from each other, will place the fish in the middle of the box so that an equal cutting is made on each side of the fish. The cutting is made in a known way, which has been intimated above. When the cutting and extraction of the entrails has been made, the cylinder 17 passes a new curve (not shown), by which the claws 15, 16 are separated. At the end of the spoke 9 a further curve roller 25 is provided. At the continued rotation of the wheel 5 the cylinder 25 passes a curve, which actuates the cylinder 25 and the catch 23 so that the catch of the head box 6 is released and the head box returns to its starting position on account of the spring 27 in the link mechanism 26. After that the head box is ready to receive another fish.

Another, somewhat simplified embodiment is shown in FIGS. 7, 8 and 9. In FIG. 7 the principle for the head measuring is shown. In FIG. 7a the fish 4 is in the fish box 3 as previously, and is prevented from sliding out of it by the stop plate 8. In FIG. 7b the head of the fish 4 has been introduced into the head box 6. In this embodiment the sensing arms are shaped as two movable measuring arms 32, with one of them extended backwards to a steering arm 33. These arms are like the head box 6 arranged on the wheel 5. At the rotation of the wheel the steering arm 33 is made to engage a curve 34 in the machine frame. The arms 32 are separated so that the fish can pass into the head box 6. When the steering arm 33 has passed the curve 34 the arms 32 are moved towards the head of the fish by spring power so that the arm 33 takes a certain position determined by the thickness of the fish head. At the continued rotation of the wheel 5 the end of the arm 33, according to FIG. 7c is caused to engage a curve 35, provided in the machine frame. The arm 33 and accordingly the head box 6 will be displaced the distance that is necessary for the fish to be cut at the optimum place.

In FIGS. 8 and 9 these members are shown more in detail. The figures show how the measuring arms 32 engage the head of the fish. The prolonged steering arm 33 is designed with a bent portion 37, which is caused to engage a stepped curve 35, which is arranged in the machine frame. When the arm portion 27 passes this curve at the turning of the wheel 5, the head box will be displaced the necessary distance through the lever system and be locked by the engagement between the bent portion 37 of the steering arm 33 and the curve 35. When the head cutting and the extraction of the entrails have been made, the curve 35 comes to an end, which extends along the path of motion of the armpart 37, concentrically with the wheel 5, which has as a consequence that the steering arm 33 is released and the spring 27 can replace the head box 6 to its starting position. After this moment the arms 32 are separated by a curve, as in the former embodiment.

By the system described above, a better method of measuring the thickness of the fish is attained, which is independent of the varying dimensions of the different portions of the fish body during the year. By the use of these facilities, it is possible to measure fishes, which have got their heads damaged, for example by having been captured in a net. Another advantage resides therein that the fish will not be deformed in the machine, and in addition thereto the output of the machine is greater than that of previous ones.

The invention is, of course, not limited to the embodiments, which have been described above, but modifications in different respects are of course possible within the scope of the following claims.

What is claimed is:

1. Apparatus for measuring fish and positioning them in an optimum position for deheading, said apparatus comprising a first conveyor having a path of movement and having a plurality of fish boxes carried thereby, each of said fish boxes being adapted to advance a fish carried thereby sideways with the fish head located on a particular side thereof, a second conveyor having a path of movement extending adjacent and substantially parallel to part of the path of movement of said first conveyor and having a plurality of head boxes carried thereby, sensing means for determining the thickness of a fish carried by a fish box in the region of the fish located immediately behind the eyes of the fish, means for locating said sensing means in an interspace between the respective paths of movement of said fish boxes and said head boxes, means for moving each of said plurality of head boxes of said second conveyor in synchronism with and in the same direction as and directly opposite to an individual fish box of said first conveyor along a portion of the path of movement of said second conveyor, means for displacing each of said head boxes toward and away from an individual fish box in the longitudinal direction of a fish resting in said fish box, a first control means fixedly mounted with respect to the paths of movement of said conveyors for actuating second control means in response to said sensing means, a plurality of second control means for controlling said head box displacing means to optimum locations, a second control means connected to each of said head boxes and movable therewith in the path of movement of said second conveyor and for controlling said head box displacing means to move its connected head box longitudinally to an optimum location dependent upon the measured thickness of the fish in its connected head box, and means for locking each head box at said optimum position.

2. Apparatus as recited in claim 1 wherein said sensing means comprise a plurality of sensing devices, one device associated with each of said head boxes.

3. Apparatus as recited in claim 2 wherein said sensing means comprises a pair of movable arms, one located on each side of said head boxes, wherein said first control means comprises a stationary curve extending laterally of and substantially parallel to a portion of the path of movement of said second conveyor, and wherein each of said second control means comprises a means operatively connected to said movable arms and operatively connected to a head box, and for engaging said stationary curve.

4. Apparatus as recited in claim 3 wherein said movable arms comprise a pair of seizing arms adapted to move synchronously towards each other to seize a fish, transport it to its optimum deheading position, and hold it during deheading.

5. Apparatus as recited in claim 1 wherein the paths of movement of said fish boxes and said head boxes are substantially semi-circular in the region where they extend substantially parallel to each other.

6. Apparatus as recited in claim 1 wherein said sensing means comprises a fixed arm and a movable arm, and wherein said first control means comprises a guide roller operatively connected to said movable arm of said sensing means by a lever system, and wherein each of said second control means comprise a cam follower adapted to cooperate with said guide roller and operatively connected to said head box displacing means.

7. Apparatus as recited in claim 1 wherein said sensing means consists of a single sensing device comprising a fixed arm and a movable arm.

* * * * *